E. A. HALBLEIB.
ELECTRIC SYSTEM.
APPLICATION FILED MAR. 19, 1913.
1,115,811.
Patented Nov. 3, 1914.
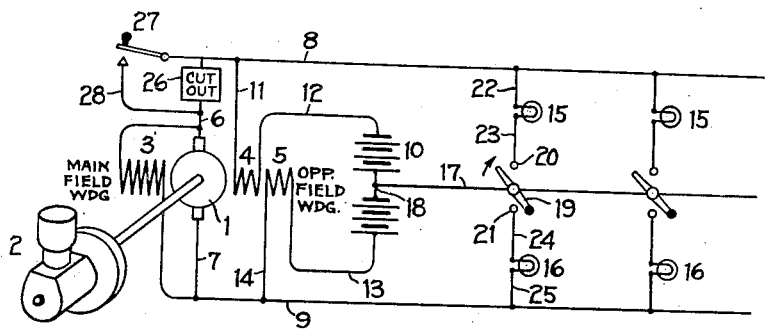
Witnesses:
E. W. Carroll
D. Gurnee.
Inventor:
Edward A. Halbleib
by his attorneys
Davis & Dorsey

UNITED STATES PATENT OFFICE.

EDWARD A. HALBLEIB, OF ROCHESTER, NEW YORK, ASSIGNOR TO NORTH EAST ELECTRIC COMPANY, OF ROCHESTER, NEW YORK, A CORPORATION OF NEW YORK.

ELECTRIC SYSTEM.

1,115,811.  Specification of Letters Patent.  Patented Nov. 3, 1914.

Application filed March 19, 1913. Serial No. 755,513.

*To all whom it may concern:*

Be it known that I, EDWARD A. HALBLEIB, a citizen of the United States, and resident of Rochester, in the county of Monroe and State of New York, have invented certain new and useful Improvements in Electric Systems, of which the following is a specification.

This invention relates to electric systems in which batteries are employed as the source of current for energizing electric lights, or other translating-devices, and particularly to a system in which an electric generator is employed as the original source of electricity, in connection with a storage-battery which is charged by the generator, and which, in turn, supplies current for the translating-devices.

In certain applications of electric batteries, and particularly in connection with motor-vehicles wherein storage-batteries are used in electric systems adapted both for electric illuminating, and for automatically starting the internal combustion-engines employed on such vehicles, it has been found desirable or necessary to employ electric lights, of the incandescent type, having comparatively short and thick filaments which are capable of successfully withstanding the vibrations incurred through the movements of the vehicle, and such electric lamps are necessarily of low resistance. Accordingly, it is necessary to energize them with currents of low electromotive force. On the other hand, however, I have found that it is desirable, in systems of the kind in question, to employ a generator and a storage-battery of higher electromotive force than that required for energizing the lamps. It is obvious that in such a case a number of electric lamps may be connected in series to produce a resistance corresponding to the electromotive force of the battery and the generator. Such an arrangement, however, particularly where used upon automobiles, may have the objectionable feature that the extinguishment of one lamp, owing to breakage of its filament, will result in the simultaneous extinguishment of the other lamp or lamps in the same circuit. In order to avoid this result, one or more intermediate or neutral conductors may be used in the load-circuit, such conductor running back from an intermediate point in the lamp-circuit to a point of intermediate electromotive force in the battery, as in the well-known three-wire transmission system. In such an arrangement, however, while it is adapted to maintain one or more lamps of a circuit in operation, notwithstanding the extinguishment of one or more of the others, it is desirable that under all normal operating conditions there be no unbalanced action whereby more current may be drawn from one part of the battery than from another part.

In systems of the type in question, where the storage-battery is charged by an electric generator, it is common to provide the generator with a winding which is in series with the armature of the generator and the storage-battery, so as to be energized by current flowing through and charging the battery, and which acts in opposition to the main field-winding of the generator, so as automatically to cut down the strength of the field-winding when the flow of current from the generator to the battery tends to become excessive. Where such an arrangement is employed in the usual manner in connection with a three-wire system as above described, the opposition field-winding constitutes an element of resistance, between the neutral conductor and one of the main load-conductors, which is not present in the circuit formed by the neutral conductor and the other main conductor. To avoid the unbalanced condition produced by this arrangement, I propose to employ, instead of a single continuous winding of the necessary number of turns, two equal parts or windings, each of one-half the number of turns, and to so connect these windings with the generator-terminals and the storage-battery that they are in series with the battery on opposite sides of the latter. The effect of the opposition-windings upon the field of the generator in such an arrangement is similar to that in the arrangement above described under normal conditions, but the resistance of the opposing-winding to the flow of current from the battery through the load-conductors is equally divided on opposite sides of the neutral conductors, so as to maintain a perfect balance, with advantages which will be apparent.

The accompanying drawing is a diagram representing an electric system embodying the present invention and adapted for use in connection with a motor-vehicle.

In the diagram I have illustrated conventionally a shunt-wound electric generator, having an armature 1 which is connected with, and actuated by, an internal-combustion engine 2. The generator has a main field-winding 3, which is connected in shunt with the armature, and two equal opposition field-windings 4 and 5 which act in series with the storage-battery as hereinafter described. By means of wires 6 and 7 the armature 1 is connected with the two main conductors 8 and 9 of the load-circuit.

A storage-battery 10 is connected across the main conductors, or "floated," so as to either receive current from the generator, or deliver current to the load-circuit, according to varying conditions in the system. From the main conductor 8 a wire 11 leads to one part 4 of the opposition field-winding, and current flows from thence through a wire 12 to one terminal of the battery. From the opposite terminal of the battery the current returns, through a wire 13, to the part 5 of the opposition field-winding, and thence, through a wire 14, to the main conductor 9. Accordingly, at any time when the generator is producing a current of sufficient electromotive force current may flow, through the connections just described, to charge the battery and, at the same time, to energize the opposition field-windings so as automatically to regulate the production of current.

The diagram illustrates translating-devices in the form of electric lamps. These lamps are arranged in pairs of equal resistance, the lamps on each pair being designated by the reference-numbers 15 and 16. This arrangement is particularly adapted for use in a motor-vehicle, wherein the lamps are usually arranged in pairs on opposite sides of the vehicle. The lamps of each pair are arranged on opposite sides of the neutral conductor 17, which leads to a middle point or terminal 18 in the storage-battery.

To throw the lamps 15 and 16 simultaneously into and out of operation, I employ a double-acting switch or circuit-controller of any ordinary or suitable form, which is illustrated diagrammatically as having a swinging contact-member 19 which is connected, at its middle point, with the neutral conductor 17. This contact-member 19 coöperates with two fixed contacts 20 and 21. In the diagram the lamps are shown as disconnected and deënergized, but when it is desired to throw either pair of lamps into operation the contact-member 19 is swung into engagement with the fixed contacts. Thereupon the circuit is closed which leads from the main conductor 8, through a wire 22, to the lamps 15, and thence through the wire 23, the fixed contact 20, the contact-member 19, and the fixed contact 21 and a wire 24 to the lamp 16, and thence through a wire 25 to the main conductor 9.

The arrangement just described is such that neither of the lamps in a pair can be thrown into or out of operation without at the same time throwing the other lamp of the pair into or out of operation, and thus, under all normal conditions, the three-wire load-circuit is maintained in a balanced condition, with no current flowing through the neutral conductor and with an equal draft upon all parts of the battery. When the lamps are in operation, however, if either of them becomes extinguished by the breakage of its filament the other lamp of the pair may continue to be energized from one-half of the storage-battery, and thus the illumination of the vehicle is not entirely interrupted by such breakage. It will be further apparent that in such a case the resistance of the circuit by which the lamp of the pair which continues in operation is energized is the same, whichever of the lamps 15 and 16 it may be, since one of the equal windings 4 or 5 is in each of these circuits, and accordingly the flow of current from the battery and through said lamp is the same in both cases.

As above stated, one advantage of the present system resides in the fact that it permits the use of lamps of low resistance, and a battery and generator of a comparatively high electromotive force, and this advantage is particularly apparent where the generator is employed also as a motor to start the engine by which it is normally actuated. Accordingly I have illustrated a system adapted to operate in this manner. An automatic return-current cut-out 26 is interposed in the wire 6 to normally prevent the return-flow of current from the storage-battery through the generator when the engine and the generator are at rest. As such devices are well known I have not illustrated the construction of the cut-out.

To permit the current to flow back from the battery through the generator when the engine is to be started, I provide a shunt-circuit around the cut-out, through a manually-operable circuit-closer 27 and a wire 28; and when this shunt-circuit is closed the generator may act as a motor to actuate the engine 2, for the purpose of starting its operation. At this time the windings 4, 5 act to reinforce the effect of the shunt field-winding 3, and thus produce a powerful torque in the generator.

The action of the opposition-windings 4 and 5 under various conditions is as follows: During the normal operation of the system, that is to say, when the number of lamps in circuit are equal on both sides of the neutral conductor 17, the opposition-windings act in a well-known manner to limit the flow of charging-current through the storage-battery. Whenever the speed of the generator is high enough to produce an electromotive force higher than that of the battery as a whole, current flows from the generator through the battery and through the two opposition-windings. When current flows in this direction the opposition-windings tend to cut down the strength of the field of the generator, and accordingly any tendency to an excessive flow of charging current to the battery will be counteracted by this reduction in the strength of the field, thus avoiding injury to the battery through charging the same at an excessive rate. This action of the opposition-windings is equivalent to that which occurs in previously proposed arrangements, in which a single opposition-winding of a number of turns equal to the combined windings 4 and 5 is interposed between the generator and the battery, wholly at one side of the latter. In such previous construction, however, it will be apparent that such a single opposition-winding constitutes an element of resistance in one of the two otherwise equal lighting-circuits on opposite sides of the neutral conductor, which causes an unbalanced action in these circuits. In order that a system of the type in question may be properly balanced, it is necessary that the neutral conductor be led off from the lighting-circuit at a point where the fall in electromotive force is equal on opposite sides of the point of connection, and this arrangement cannot be secured in such previous construction by locating the point of connection between lamps or translating-devices of equal resistance, as is necessary where the lamps are employed in pairs of equal resistance. Accordingly, in such previously proposed arrangement there will be a constant flow of current through the neutral conductor to balance the effect of the single opposition-winding, so that one-half of the battery will be charged and discharged at a different rate from the other half, and the lamps on one side of the neutral conductor will be energized more strongly than those on the other side. By dividing the opposition-winding into two equal parts, however, and locating these parts on opposite sides of the battery, this unbalanced action is entirely eliminated.

In case one or more of the lamps on either side of the neutral conductor burns out or becomes disconnected, the system is temporarily unbalanced, and such a condition should be corrected as soon as convenient. It does not, however, interfere with the continued operation of the system to energize the remaining lamps, and the results are not serious unless too long continued. In such a case the use of two equal opposition-windings in the manner disclosed is still advantageous, as these windings continue to have their limiting effect upon the charging current flowing through the battery, while at the same time they tend to maintain as nearly as possible the balanced condition of the system. Where a single opposition-winding is employed, on the other hand, as in previously proposed systems, if a lamp or other translating-device be cut out in the half of the load-circuit which includes the opposition-winding, this half of the circuit, of which the resistance is already greater than that of the other half, becomes even more unbalanced than under normal conditions, whereas by the present arrangement the unbalancing effect due to the accidental extinguishing of a lamp is minimized.

While I have illustrated the invention as embodied in a system in which a single neutral conductor is employed, dividing the battery into equal parts in connection with lamps of equal resistance arranged in pairs, it will be understood that the invention is not limited to this specific arrangement, but that it is capable of various other embodiments within the scope of the following claims.

I claim:—

1. In an electric system, the combination, with a storage-battery, two main conductors, a neutral conductor extending from the point of neutral electromotive force in the battery, and translating-devices connected across one main conductor and the neutral conductor and across the neutral conductor and the other main conductor, respectively, of a generator having two equal opposition-windings and connections between the generator, the main conductors and the storage-battery, whereby the generator normally supplies current for the main conductors and for recharging the storage-battery, the current for the latter purpose flowing, from the armature of the generator, first through one opposition-winding, then through the storage-battery, and then through the other opposition-winding and back to the armature, whereby the two opposition-windings are interposed, respectively, between the opposite poles of the battery and the respective main conductors.

2. In an electric system, the combination, with a storage-battery, two main conductors and a neutral conductor extending from the middle-point of the battery, and a pair of electric lamps of substantially equal resistance connected, respectively, across one main conductor and the neutral conductor and across the neutral conductor and the other main conductor; of a generator having two equal opposition-windings; and connections between one of said windings, one main conductor, and one terminal of the battery, and between the other of said windings, the other main conductor, and the other terminal of the battery, whereby the battery and the two opposition-windings are arranged in series across the main conductors, so as to provide equal resistance and electromotive force between the neutral conductor and each of the main conductors.

EDWARD A. HALBLEIB.

Witnesses:
W. A. MONTGOMERY,
FARNUM F. DORSEY.